United States Patent [19]
Kemme et al.

[11] 3,886,223
[45] May 27, 1975

[54] ISOMERIZATION OF ISOPROPYLNAPHTHALENE ALKYLATE MIXTURES

[75] Inventors: Herbert Rudolph Conrad Kemme, Flemington; Edward Jonathan Scharf, Somerville, both of N.J.

[73] Assignee: American Cyanamid Company, Stamford, Conn.

[22] Filed: May 1, 1974

[21] Appl. No.: 465,966

[52] U.S. Cl............ 260/668 A; 260/668 F
[51] Int. Cl............ C97c 5/28; C97c 15/24
[58] Field of Search ........ 260/668 A, 668 F

[56] References Cited
UNITED STATES PATENTS
3,251,897   5/1966   Wise .................. 260/671 R
3,845,149   10/1974   Pietzsch et al. ............. 260/668 A Primary Examiner—Veronica O'Keefe
Attorney, Agent, or Firm—John L. Sullivan

[57] ABSTRACT

Alkylate mixture of alpha and beta isopropylnaphthalenes containing low ratios of beta/alpha isomer and which do not contain propylene are isomerized in the presence of a rare earth metal exchanged "Y" type aluminosilicate catalyst at a temperature of from about 200°C. to 325°C., a space velocity of from about 0.1 to 4 hour$^{-1}$ and a pressure of from about 200 psig to 500 psig, to produce mixture having high beta/alpha isopropylnaphthalene ratios.

2 Claims, No Drawings

ISOMERIZATION OF ISOPROPYLNAPHTHALENE ALKYLATE MIXTURES

This invention relates to a process for the preparation of beta-isopropylnaphthalene in high yield and purity from mixtures of alpha and beta isopropylnaphthalene containing high concentrations of the alpha isomer. More particularly, it relates to a process for treating mixtures of isopropylnaphthalenes obtained from any source to increase the beta isopropylnaphthalene content thereof by a batch or continuous isomerization reaction in the presence of a rare earth metal exchanged, "Y type" crystalline aluminosilicate catalyst. The process also includes disproportionation of higher alkylates of naphthalene, such as diisopropylnaphthalene, under the same conditions to enrich the beta isomer content of said mixtures.

It is known to alkylate naphthalene with propylene in the presence of a synthetic crystalline aluminosilicate (zeolite) catalyst to obtain isopropylnaphthalene (Wise, U.S. Pat. No. 3,251,897). However, under conditions necessary to achieve a high mole ratio of beta-/alpha isomers in the isopropylnaphthalene, the yield of isopropylnaphthalene must be sacrificed due to tar formation and polymerization of propylene. Formation of these by-products also tends to shorten the life of the catalyst. On the other hand, if conditions of alkylation are such as to reduce tar formation, reduce propylene polymerization and prolong catalyst life, such as by the use of lower temperatures, the process is inefficient and results in low yields of the desired beta isopropylnaphthalene. Thus, there is no method of which we are aware to efficiently produce isopropylnaphthalene in high yield and high beta isomer content and with economic use of catalyst by direct alkylation of naphthalene with propylene. As far as we are aware, this is true regardless of the catalyst used.

There remains, therefore, a need for a process for the preparation of beta isopropylnaphthalene in high yield.

We have now discovered a method for isomerizing mixtures of alpha and beta isopropylnaphthalenes containing low concentrations of beta isopropylnaphthalene, such as are obtained readily by low temperature alkylation of naphthalene with propylene, to product mixtures containing high concentrations of beta isopropylnaphthalene. Thus, in accordance with the process of the invention, alkylate mixtures of alpha and beta isopropylnaphthalenes containing low ratios of beta/alpha isomer and which do not contain propylene, are isomerized under conditions such that the beta/alpha ratio is increased to 90+% beta isopropylnaphthalene. The isomerization can be conducted batchwise or continuously with excellent conversion to high beta isomer content and prolonged catalyst life.

In a continuous process, the alpha isomer is returned to the isomerizer and higher alkylates, such as diisopropylnaphthalenes, are disproportionated with naphthalene to isopropylnaphthalenes, which are also recycled to the isomerizer.

Although the isomerization of mixtures containing low beta/alpha isopropylnaphthalene ratios may be conducted either batchwise or continuously, it is preferable to operate continuously.

The catalyst used in the isomerization reaction is a rare earth metal exchanged "Y" type crystalline synthetic aluminosilicate. Such catalysts are described by Wise in U.S. Pat. No. 3,251,897. A preferred species of such catalyst is a rare earth metal exchanged "Y" type aluminosilicate as the active component on an amorphous alumina matrix. Such a catalyst, containing about 7–15% of the active component (based on $RE_2O_3$ analysis where RE refers to rare earth), is available commerically as Aerocat TS–150 cracking catalyst from American Cyanamid Company.

The mixture to be isomerized is fed by means of a metering pump upwardly through a fixed catalyst bed at a space velocity (S.V.) of from about 0.1 to 4 hr.$^{-1}$ (S.V.=ft.$^3$ aromatic-hour$^{-1}$/ft.$^3$ catalyst bed volume). If the S.V. is less than about 0.1 hour.$^{-1}$, the reaction is not economical and requires large scale equipment, if greater than about 4hr.$^{-1}$, the degree of conversion is too low. It is preferable to operate at S.V. of 0.3 hr.$^{-1}$ to 1.0 hr.$^{-1}$.

The temperature of isomerization should be between 200°C. and 325°C. Temperatures above 325°C. result in excessive tar formation and shortened catalyst life due to catalyst fouling. Below about 200°C., the isomerization reaction is too slow. The preferred temperature range is about 225°C. to 275°C. As the reaction temperature is increased, it is desirable to increase the space velocity, thereby minimizing tar formation and increasing catalyst life. A combination of low temperature and low space velocity is preferred.

Positive pressure is necessary to maintain flow through the reactor and to prolong catalyst life. Atmospheric pressure tends to shorten catalyst life. Pressures of 200 psi to 500 psi are preferred in order to keep the system in liquid phase.

The equivalent naphthalene/propylene (N/P) ratio is an important factor in the isomerization. The mixtures to be isomerized contain naphthalene, isopropylnaphthalene and diisopropylnaphthalene. The isomerization feed stock should contain from about 1 to 10 equivalents of naphthalene per equivalent of propylene, taking all alkylated and unalkylated species into account. It is preferable to have an N/P ratio of from about 2 to 4. Low N/P ratios favor formation of high concentrations of diisopropylnaphthalene during isomerization; high N/P ratios lead to low reaction efficiency.

The following examples illustrate the invention.

EXAMPLE 1

A series of alkylations of naphthalene with propylene were run using Aerocat TS–150 catalyst. The conditions used and the results obtained are shown in Table 1.

TABLE 1

Direct Alkylation of Naphthalene with Propylene

| Run No. | N/P[1] Ratio | S.V. hr$^{-1}$ | Temp. °C. | % Yield | % Beta IPN based on total IPN in alkylate | % Tars | |
|---|---|---|---|---|---|---|---|
| 1 | 6 | 0.72 | 225 | 97.6 | 83.4 | 2.82 | |
| 2 | 12 | 2.5 | 225 | 97.7 | 87.3 | 3.11 | High |
| 3 | 6 | 2.5 | 225 | 96.7 | 88.3 | 3.85 | Tar |
| 4 | 6 | 2.5 | 225 | 94.3 | 91.7 | 6.5 | Formation |
| 5 | 6 | 0.72 | 235 | 98.4 | 80.5 | 1.96 | |

TABLE 1 –Continued

Direct Alkylation of Naphthalene with Propylene

| Run No. | N/P[(1)] Ratio | S.V. hr[-1] | Temp. °C. | % Yield | % Beta IPN based on total IPN in alkylate | % Tars | |
|---|---|---|---|---|---|---|---|
| 6 | 12 | 0.72 | 160 | 99.6 | 37.1 | 0.02 | |
| 7 | 6 | 2.5 | 160 | 99.2 | 39.0 | 0.23 | |
| 8 | 6 | 0.72 | 160 | 99.8 | 33.5 | 0.13 | Low |
| 9 | 12 | 2.5 | 160 | 100 | 38.2 | 0 | Tar |
| 10 | 12 | 0.72 | 225 | 100 | 37.5 | 0 | Formation |
| 11 | 6 | 0.72 | 160 | 99.99 | 32.4 | 0.11 | |
| 12 | 9 | 1.6 | 193 | 99.6 | 47.2 | 0.37 | |
| 13 | 6 | 2.5 | 160 | 99.96 | 60.0 | 0.5 | |

[(1)]Mole Ratio of naphthalene to propylene fed to alkylator

The data in Table 1 illustrate that, although very high yields of beta isomer are obtained at the higher temperatures, the relatively high tar formation will coat the catalyst, blocking off active sites, thereby reducing catalyst life. Conversely, the lower temperatures give relatively low tar levels and provide longer catalyst life.

EXAMPLE 2

Continuous Isomerization

The following alkylation mixtures were subjected to continuous isomerization (Runs 1–10) under the conditions described in Table 2.

Alkylation Mixtures, A, B, and C obtained over $BF_3$-$H_3PO_4$ catalyst.

Alkylation Mixture D, a composite of the following composition:

33,000 parts obtained using Aero 25 catalyst (25% Alumina - 75% silica);
5,000 parts obtained using Aero 8030 catalyst (80% Alumina - 20% silica); and
118,000 parts obtained using TS-150 catalyst As will be seen from Table 2, product compositions having a high beta isopropylnaphthalene are obtained with disproportionation of DIPN to IPN.

EXAMPLE 3

Continuous Isomerization with Enriched Feed

A series of continuous isomerizations (Runs 1–15), operating at "steady state," in which the feed stream entering the isomerizer was enriched, i.e., contained in addition to a feed steam obtained by direct alkylation, one rich in diisopropylnaphthalene to be converted to isopropylnaphthalene by disproportionation with naphthalene, and one rich in recycled isopropylnaphthalenes (both isomers), gave the results shown in Table 3. The pressure used in all runs was 500 psig.

TABLE 2

Continuous Isomerization Using TS-150 Catalyst

| | | | | | Feed Composition | | | | | Product Composition | | | | |
|---|---|---|---|---|---|---|---|---|---|---|---|---|---|---|
| Run No. | Alkylation Comp. | S.V. Hr[-1] | Temp. °C. | Pressure psig | % N | % αIPN | % βIPN | DIPN | %β / α+β | % N | % αIPN | % βIPN | DIPN | % β / α+β |
| 1 | C | 1.0 | 200 | 500 | 69.3 | 12.5 | 18.2 | — | 59.0 | 70.2 | 1.92 | 28.4 | 1.02 | 93.7 |
| 2 | A | 1.0 | 225 | 300 | 57.0 | 14.6 | 25.4 | — | 59.0 | 52.8 | 3.18 | 35.7 | 1.13 | 91.8 |
| 3 | A | 1.0 | 250 | 300 | 57.0 | 14.6 | 25.4 | — | 59.0 | 58.1 | 2.16 | 37.7 | 3.30 | 94.6 |
| 4 | A | 1.0 | 275 | 300 | 57.0 | 14.6 | 25.4 | — | 59.0 | 61.0 | 1.89 | 35.0 | 4.04 | 94.9 |
| 5 | B | 0.5 | 250 | 300 | 64.0 | 9.8 | 14.2 | 12 | 59.0 | 59.3 | 1.60 | 31.9 | 5.64 | 95.2 |
| 6 | B | 0.5 | 250 | 300 | 64.0 | 9.9 | 14.2 | 12 | 59.0 | 59.9 | 1.53 | 32.5 | 5.60 | 95.5 |
| 7 | D | 2.0 | 200 | 500 | 71.3 | 10.9 | 9.16 | 7.7 | 45.7 | 73.2 | 2.1 | 20.6 | 3.5 | 90.9 |
| 8 | B | 2.0 | 250 | 300 | 64.0 | 9.8 | 14.2 | 12 | 59.0 | 68.5 | 2.15 | 34.3 | 7.9 | 94.1 |
| 9 | B | 3.0 | 250 | 300 | 64.0 | 9.8 | 14.2 | 12 | 59.0 | 60.2 | 3.7 | 25.3 | 8.5 | 87.2 |
| 10 | B | 4.0 | 250 | 300 | 64.0 | 9.8 | 14.2 | 12 | 59.0 | 63.5 | 4.6 | 24.9 | 8.7 | 84.4 |

TABLE 3

| | Feed Stream Components | | | | | Feed Stream Composition | | | | | Mol Ratio | | | | | Equiv. N/P mol Ratio |
|---|---|---|---|---|---|---|---|---|---|---|---|---|---|---|---|---|
| Run No. | % N | % αIPN | % βIPN | % IPN | βIPN /α+ βIPN | % N | % αIPN | % βIPN | % IPN | βIPN /α+ IPN | N/ IPN | IPN /IPN | S.V. Hr[-1] | Temp. °C. | βIPN /α+β PN% | |
| 1(a) | 89.2 | 8.8 | 4.4 | 13.2 | 1.3 | 33.9 | 72.3 | 8.0 | 14.6 | 2.2 | 22.6 | 64.0 | 4.25 | .079 | .602 | 200–206 | 76.5 | 4.6 |
| (b) | 0.1 | 0.5 | 4.4 | 4.9 | 72.6 | 89.5 | | | | | | | | | | | | |
| (c) | 0.1 | — | — | 99.3 | — | — | | | | | | | | | | | | |
| 2(a) | 83.2 | 8.3 | 6.7 | 15.0 | 1.3 | 4.3 | 41.1 | 9.1 | 44.2 | 2.2 | 53.3 | 82.7 | 1.02 | .037 | .359 | 200–209 | 88.4 | 1.98 |
| (b) | — | 0.1 | .5 | 0.6 | 96.5 | 82.5 | | | | | | | | | | | | |
| (c) | 0.8 | 14.2 | 83.9 | 98.1 | 0.2 | 85.5 | | | | | | | | | | | | |
| 3(a) | 85.8 | 8.3 | 4.3 | 12.6 | 1.3 | 35.0 | 50.9 | 8.1 | 26.7 | 8.0 | 34.8 | 77.0 | 1.94 | .183 | .277 | 194–201 | 84.7 | 2.3 |
| (b) | — | 0.1 | 0.5 | 0.6 | 96.5 | 82.5 | | | | | | | | | | | | |
| (c) | 0.8 | 13.3 | 85.8 | 99.1 | — | 86.5 | | | | | | | | | | | | |
| 4(a) | 83.6 | 8.3 | 4.1 | 12.4 | 1.3 | 32.8 | 53.7 | 9.4 | 28.7 | 4.3 | 38.1 | 78.1 | 1.86 | .09 | .280 | 267–303 | 90.0 | 2.50 |
| (b) | — | 0.1 | 0.5 | 0.6 | 96.5 | 82.5 | | | | | | | | | | | | |
| (c) | 0.4 | 13.3 | 85.5 | 97.1 | — | 86.4 | | | | | | | | | | | | |
| 5(a) | 88.0 | 9.2 | 4.7 | 13.9 | 1.4 | 33.7 | 59.0 | 8.7 | 25.8 | 3.3 | 34.5 | 75.2 | 2.26 | .077 | .701 | 199–207 | 81.9 | 2.92 |
| (b) | 0.1 | .04 | .4 | .5 | 102 | 89.5 | | | | | | | | | | | | |
| (c) | — | — | — | 98.0 | — | — | | | | | | | | | | | | |

TABLE 3 — Continued

| Run No. | Feed Stream Components | | | | | | Feed Stream Composition | | | | | Mol Ratio | | | S.V. Hr⁻¹ | Temp. °C. | βIPN/α+β PN% | Equiv. N/P mol Ratio |
|---|---|---|---|---|---|---|---|---|---|---|---|---|---|---|---|---|---|---|
| | % N | % αIPN | % βIPN | % IPN | % βIPN/α+βIPN | | % N | % αIPN | % βIPN | % IPN | % IPN | βIPN/αIPN | N/IPN | IPN/IPN | | | | |
| 6(a) | 85.1 | 9.0 | 5.1 | 14.1 | 1.6 | 35.7 | 55.4 | 9.7 | 29.1 | 2.5 | 38.8 | 75.0 | 1.9 | .063 | .673 | 299–305 | 92.1 | 2.64 |
| (b) | 0.1 | — | .5 | .5 | 102 | 92.0 | | | | | | | | | | | | |
| (c) | — | 15.5 | 81.5 | 97.0 | — | 84.0 | | | | | | | | | | | | |
| 7(a) | 81.6 | 8.6 | 4.3 | 12.9 | 1.3 | 34.8 | 68.9 | 7.4 | 15.1 | 4.5 | 22.5 | 67.0 | 4.07 | .016 | .627 | 296–300 | 92.5 | 3.96 |
| (b) | 0.1 | — | 0.5 | 0.5 | 102 | 92.0 | | | | | | | | | | | | |
| (c) | 0.4 | 11.7 | 81.2 | 92.9 | — | 87.7 | | | | | | | | | | | | |
| 8(a) | 83.6 | 8.9 | 4.1 | 13.0 | 1.4 | 31.6 | 36.3 | 8.4 | 45.2 | 5.9 | 53.6 | 84.4 | 0.9 | .088 | .377 | 277–300 | 91.4 | 1.7 |
| (b) | — | 0.1 | 0.5 | 0.6 | 96.5 | 83.0 | | | | | | | | | | | | |
| (c) | 0.5 | 10.7 | 83.3 | 94.0 | 0.2 | 88.5 | | | | | | | | | | | | |
| 9(a) | 86.2 | 8.7 | 4.0 | 12.7 | 1.2 | 31.4 | 60.9 | 8.6 | 24.8 | 3.9 | 33.4 | 74.3 | 2.4 | .093 | .488 | 247–251 | 92.3 | 2.94 |
| (b) | — | — | 0.9 | 0.9 | | | | | | | | | | | | | | |
| | | | | | 08.7 | | | | | | | | | | | | | |
| (c) | — | 14.5 | 81.8 | 96.3 | — | 84.8 | | | | | | | | | | | | |
| 10(a) | 84.2 | 8.4 | 4.4 | 12.8 | 1.2 | 34.2 | 57.8 | 9.0 | 27.6 | 3.8 | 36.6 | 75.4 | 2.1 | .083 | .470 | 249–254 | 91.1 | 2.74 |
| (b) | — | — | .4 | .4 | 96.0 | 87.3 | | | | | | | | | | | | |
| (c) | 0.1 | 11.5 | 84.5 | 96.0 | — | 88.1 | | | | | | | | | | | | |
| 11(a) | 85.3 | 8.5 | 4.0 | 12.5 | 1.6 | 32.1 | 68.9 | 7.9 | 15.7 | 4.3 | 23.6 | 66.5 | 3.86 | .148 | .633 | 247–251 | 90.7 | 3.86 |
| (b) | 0 | 0 | .4 | 0.4 | 96.0 | — | | | | | | | | | | | | |
| (c) | .6 | 10.6 | 86.1 | 96.7 | 0.5 | 89.0 | | | | | | | | | | | | |
| 12(a) | 83.6 | 7.7 | 4.3 | 12.0 | 1.5 | 36.5 | 51.9 | 8.9 | 28.7 | 7.0 | 37.6 | 76.4 | 1.84 | .151 | .269 | 200–212 | 86.8 | 2.30 |
| (b) | — | — | 0.9 | 0.9 | 95.5 | — | | | | | | | | | | | | |
| (c) | 0.2 | — | — | 1000 | — | 85.2 | | | | | | | | | | | | |
| 13(a) | 86.6 | 8.5 | 5.6 | 14.1 | 1.5 | 39.8 | 59.1 | 8.7 | 26.8 | 3.2 | 35.5 | 75.5 | 2.2 | .071 | .686 | 201–212 | 78.7 | 2.86 |
| (b) | — | — | — | — | 97.0 | — | | | | | | | | | | | | |
| (c) | 0.3 | — | — | 95.0 | — | 86.2 | | | | | | | | | | | | |
| 14(a) | 81.4 | 7.2 | 4.8 | 12.0 | 1.3 | 39.9 | 66.1 | 7.9 | 16.7 | 3.9 | 24.6 | 68.1 | 3.57 | .158 | .601 | 297–302 | 90.6⁻ | 3.59 |
| (b) | — | — | — | — | 97.0 | — | | | | | | | | | | | | |
| (c) | 0.2 | — | — | 99.4 | — | 85.1 | | | | | | | | | | | | |
| 15(a) | 81.5 | 8.5 | 4.8 | 13.3 | 1.6 | 36.2 | 36.9 | 10.1 | 44.2 | 5.1 | 54.3 | 81.0 | .933 | .094 | .401 | 292–300 | 90.7 | 1.72 |
| (b) | — | — | 0.9 | 0.9 | 95.5 | — | | | | | | | | | | | | |
| (c) | 0.1 | — | — | 98.5 | — | 85.1 | | | | | | | | | | | | | a = alkylator stream
b = DIPN enriched
c = IPN recycle

It is seen that, operating as set forth in Table 3, the β-IBN content of the feed stream is substantially increased.

We claim:

1. A process for increasing the beta isopropylnaphthalene content of a mixture containing essentially naphthalene, alpha and beta isopropylnaphthalene and diisopropylnaphthalene, which comprises contacting said mixture with a rare earth metal exchanged, synthetic, crystalline "Y" type aluminosilicate catalyst at a temperature of from about 200°C. to 325°C., a space velocity of from about 0.1 to 4 hour⁻¹, and a pressure of from about 200 psig to 500 psig, said mixture having an equivalent naphthalene to equivalent propylene ratio of from about 1 to 10.

2. A process according to claim 1 wherein the temperature is about 220°C., the space velocity is about 0.5 hour⁻¹, the pressure is about 500 psig and the naphthalene to propylene ratio is about 3.

* * * * *